UNITED STATES PATENT OFFICE.

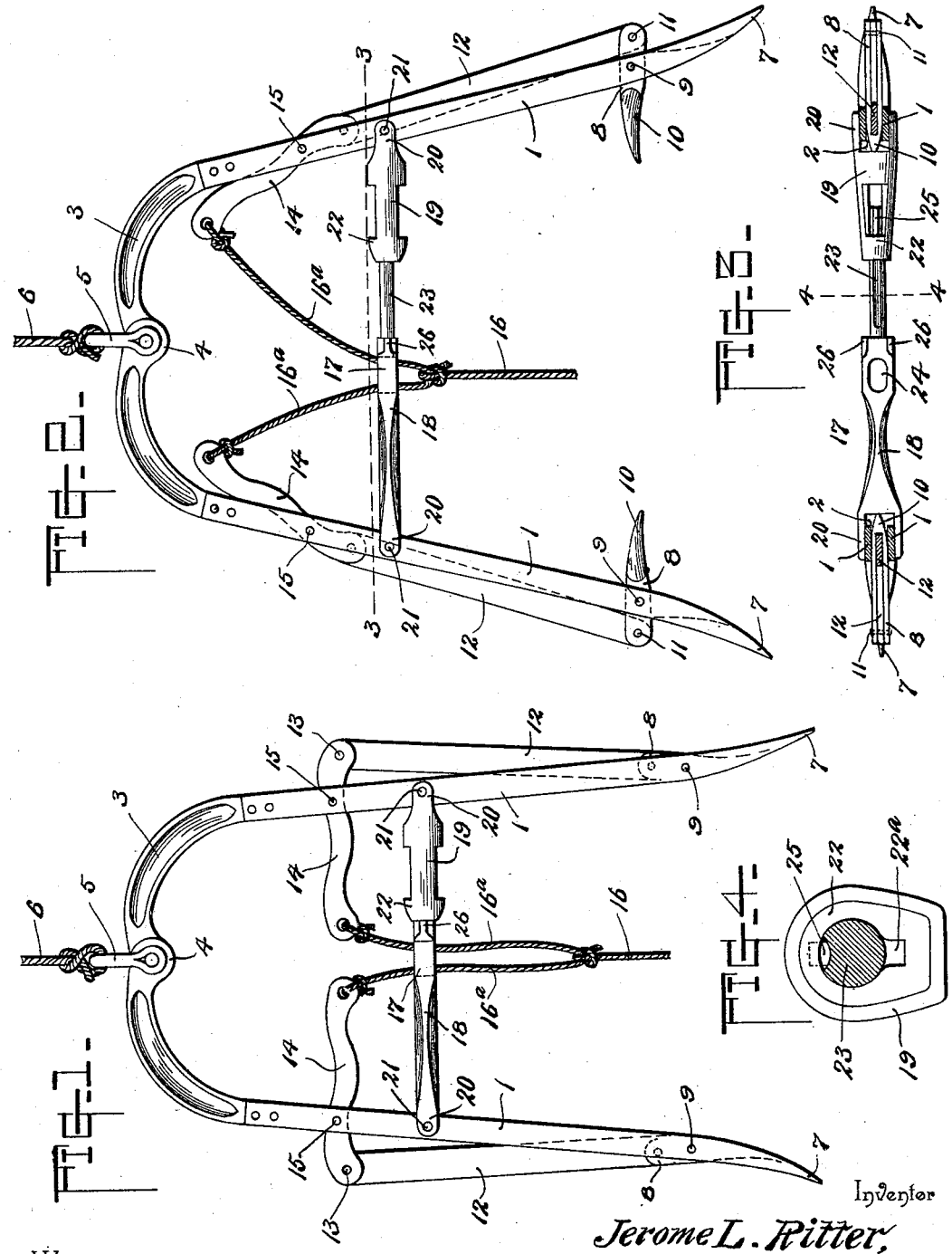

JEROME L. RITTER, OF NEWPORT, PENNSYLVANIA.

AUTOMATIC HARPOON HAY-FORK.

SPECIFICATION forming part of Letters Patent No. 591,609, dated October 12, 1897.

Application filed January 20, 1897. Serial No. 619,951. (No model.)

*To all whom it may concern:*

Be it known that I, JEROME L. RITTER, a citizen of the United States, residing at Newport, in the county of Perry and State of Pennsylvania, have invented a new and useful Automatic Harpoon Hay-Fork, of which the following is a specification.

This invention relates to harpoon hay-forks; and it has for its object to provide certain new and useful improvements in forks of this character whereby the capacity of the same shall be greatly increased.

To this end the main and primary object of the present invention is to so construct a harpoon horse hay-fork that the same will automatically gather a large quantity of hay when inserted therein and will also automatically wedge its load of hay in place within the fork during the act of hoisting.

With these and many other objects in view, which will readily appear as the nature of the invention is better understood, the same consists in the novel construction, combination, and arrangement of parts hereinafter more fully described, illustrated, and claimed.

In the drawings, Figure 1 is a front elevation of a harpoon hay-fork constructed in accordance with this invention with the parts arranged ready for loading. Fig. 2 is a similar view of the fork spread open to the position it occupies when loaded and being hoisted with its load. Fig. 3 is a cross-sectional view on the line 3 3 of Fig. 2. Fig. 4 is a detail sectional view on the line 4 4 of Fig. 3.

Referring to the accompanying drawings, 1 1 designate a pair of oppositely-located tines provided with longitudinal slots 2, extending nearly the entire length thereof, and at one end the tines 1 are provided with the inwardly-curved head extensions 3, jointed together at the point 4 by a hinge-joint. At the hinge-joint 4, between the head extensions 3 of the opposite tines 1, is loosely fitted a hoisting-clevis 5, to which the ordinary hoisting-rope 6 connects in the usual way.

The opposite longitudinally-slotted hinged fork-tines 1 are provided at their extremities opposite the hinge-joint 4 with tapered outwardly-curved or outturned spear-points 7, that are adapted to be speared into a bunch or load of hay when the fork is being loaded. Adjacent to the outwardly-curved spear-points 7 the tines 1 have pivotally mounted within the lower ends of the longitudinal slots 2 thereof the pivotal harpoon prongs or barbs 8. The harpoon prongs or barbs 8 are pivoted intermediate of their ends on the pivot-pins 9 and are provided with tapered beveled ends 10, that are designed to be turned flush within the lower extremities of the slots 2, so as to lie within the plane of the points 7, and thereby allow the tines to freely enter the load or bunch of hay.

The outer ends of the harpoon prongs or barbs 8 have pivotally connected thereto, as at 11, one end of the adjusting-links 12, which work within the plane of the longitudinal slots 2 and are pivotally connected at their other ends, as at 13, to the outer extremities of the trip-levers 14.

The trip-levers are oppositely located and are respectively pivoted between their ends on the pins 15 within the slots 2 of the opposite tines, said levers 14 being located within the ends of the slots 2, opposite the harpoon prongs or barbs 8. The trip-levers 14 are arranged to work between the tines and within the head portion of the fork, and have attached to their inner ends the branches 16ᵃ of a trip-rope 16, which rope is conveniently under the control of the operator for the purpose of tripping or retracting the harpoon prongs or barbs 8 when it is desired to trip the fork of its load.

At a point intermediate of their ends the opposite tines 1 of the fork are connected by a sectional slidably-jointed cross-brace 17, essentially comprising a telescoping slide-bar 18 and tubular guide-sleeve 19, which slide-bar and sleeve are provided at their outer ends with bifurcations 20, respectively embracing and pivoted to the opposite fork-tines 1 on the pivot-pins 21. The tubular guide-sleeve 19 is preferably a skeleton casting and is provided at its inner end with a collar 22, provided in the lower side of its opening with a groove 22ᵃ and adapted to slidably receive in its opening the spindle extension 23 at the inner end of the slide-bar 18, said slide-bar 18 being further provided intermediate of its ends with the rope-opening 24 to loosely receive therein the separate branch portions of the trip-rope. The spindle extension 23 of the slide-bar is provided at one end with a stop lug or fin 25, which is adapted to engage against the inner side of the collar 22 to limit the spreading of the fork, and when the slide-bar is disconnected from the fork-tine to which it is pivoted it is simply necessary to turn the slide-bar axially to bring the stop lug or fin 25 in alinement with the groove 22ª, thereby allowing the spindle extension 23 of the slide-bar to be readily disengaged from and reëngaged with the tubular guide 19, as will be readily understood. At the base of the spindle extension 23 the slide-bar 18 is further provided with oppositely-located stop-lugs 26, adapted to engage against the inner end of the tubular guide-sleeve 19 to limit the inward movement of the fork-tines.

In a normal condition ready for loading the hinged fork-tines 1 are disposed as close together as possible, but in the normal position it is to be noted that the said tines diverge from each other toward their points 7, so that when the fork is inserted or forced into the hay the tines will automatically spread away from each other to the position illustrated in Fig. 2 of the drawings. Before the fork is inserted into the hay the harpoon prongs or barbs are turned flush within the lower extremities of the slots 2, so as to offer no obstruction to the entrance of the fork into the hay, and by reason of the divergence of the tines 1 and the outward curvatures of their points 7 the tines are forced to automatically spread wide apart to the limit of movement of the slidably-jointed cross-brace 17, and thereby take a large quantity of hay between the two tines. When the fork has thus been inserted into the hay, the trip-levers 14 are manually adjusted so as to carry the harpoon prongs or barbs 8 out of the slots 2 and into the hay confined between the tines. The fork is now ready for elevation with its load, and when the hoisting-rope 6 draws taut on the clevis 5 the tines will be forced toward each other and thereby tightly bind or wedge the load of hay therebetween. When the trip-rope 16 is pulled, the prongs or barbs 10 are carried out of the hay, thereby allowing it to slip from the fork, which will then be ready for another load.

The many advantages of the herein-described fork will be readily apparent to those skilled in the art without further description, and it will be understood that various changes in the form, proportion, and the minor details of construction may be resorted to without departing from the principle or sacrificing any of the advantages thereof.

Having thus described the invention, what is claimed, and desired to be secured by Letters Patent, is—

1. A hay-fork comprising a pair of tines carrying harpoon prongs or barbs and hinged together at one end, and a sectional brace comprising a guide-sleeve pivotally connected to one of the tines, and a slide-bar pivotally connected to the opposite tine and provided with a spindle extension detachably and slidably engaging with said sleeve, substantially as set forth.

2. A hay-fork comprising a pair of tines carrying harpoon prongs or barbs and provided at one end with inturned head extensions connected together by a hinge-joint, and at their opposite ends with tapered outwardly-curved points, substantially as set forth.

3. A hay-fork comprising a pair of tines carrying harpoon prongs or barbs and hinged together at one end, a tubular guide pivotally connected to one of the tines intermediate its ends and provided at its inner end with a collar having in the lower side of its opening a groove, and a slide-bar pivotally connected to the opposite tines and provided at its inner end with a spindle extension sliding in said collar and having at one end a stop lug or pin adapted to be turned into alinement with said groove, said slide-bar being further provided at the base of its spindle extension with oppositely-located stop-lugs, substantially as set forth.

In testimony that I claim the foregoing as my own I have hereto affixed my signature in the presence of two witnesses.

JEROME L. RITTER.

Witnesses:
DAVID L. SWARTZ,
MILES L. RITTER.